United States Patent Office 2,925,799
Patented Feb. 23, 1960

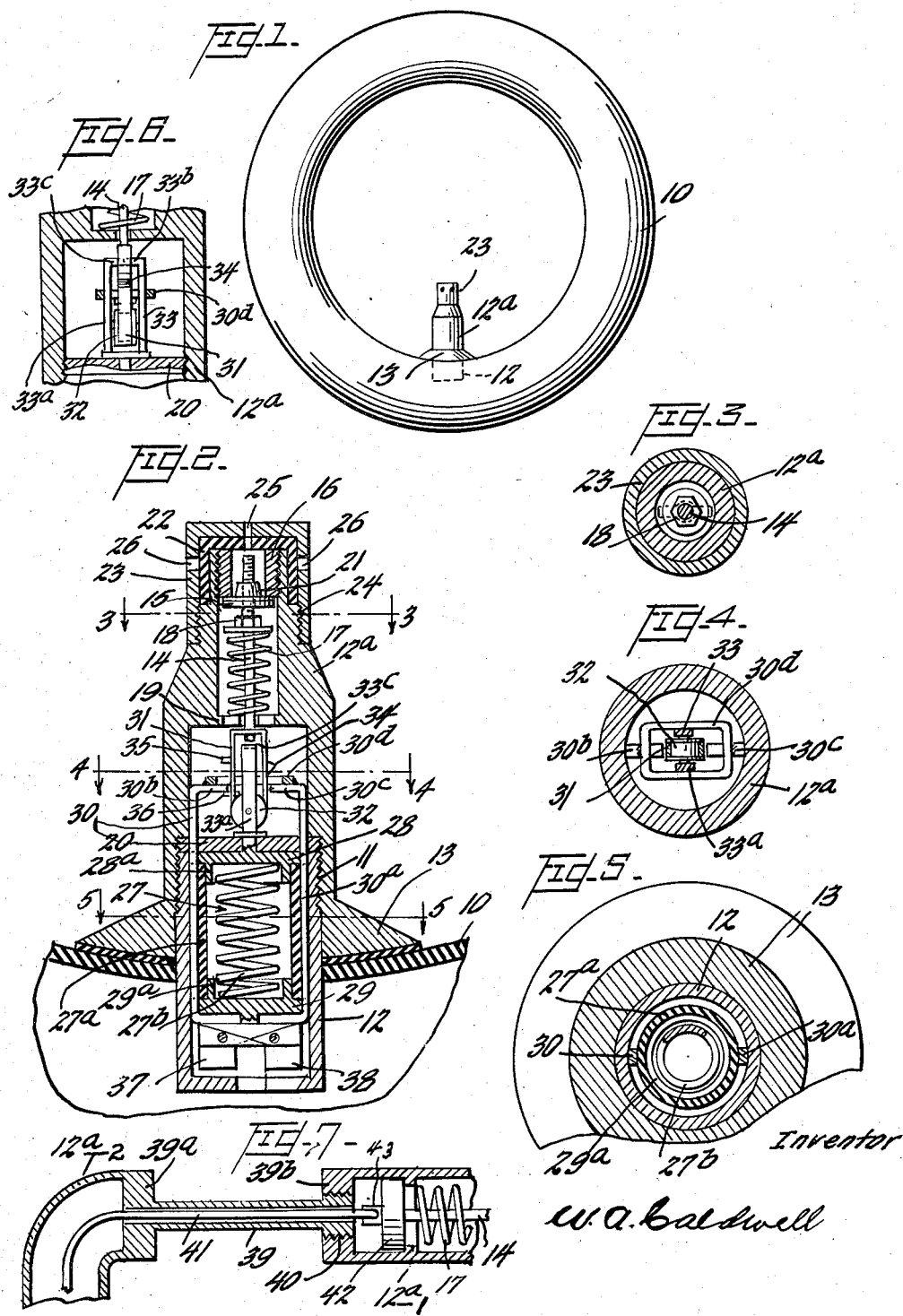

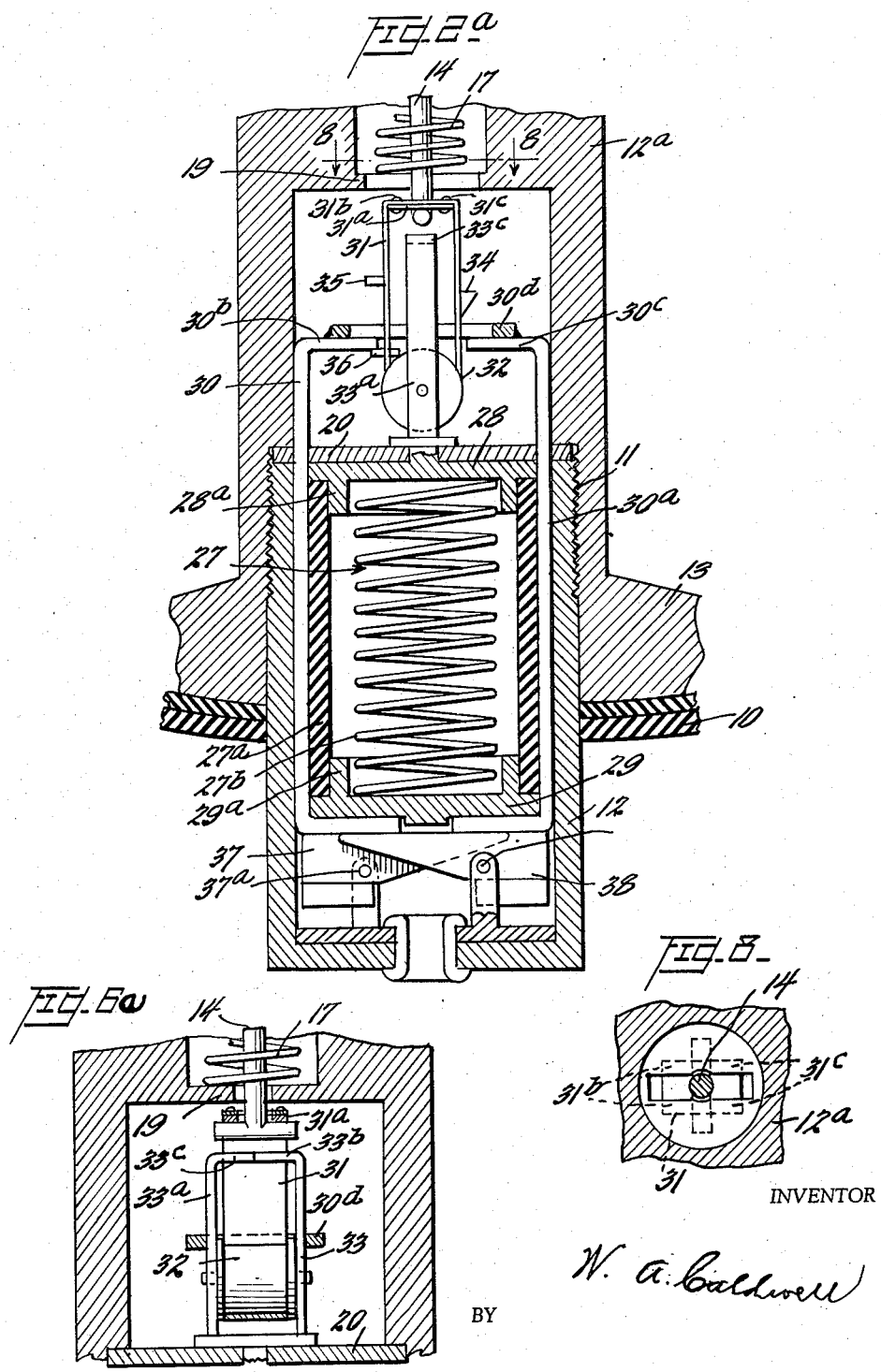

2,925,799

UNIVERSAL RELIEF VALVE AND PRESSURE SIGNAL FOR PNEUMATIC TIRES

William Addison Caldwell, Leesburg, Tex.

Application July 30, 1957, Serial No. 675,196

3 Claims. (Cl. 116—34)

This invention relates to pneumatic tires for vehicles. It has for its object to provide certain improvements in the construction of such tires, particularly the inner tube, primarily for the purpose of protecting them against excessive pressure, both at the time of inflation and in the course of ordinary operation.

A second purpose served by my invention is to provide an audible warning signal of a dangerous increase or decrease of pressure in the tire over or below the normal operating pressure.

A third purpose served by my invention is to provide a relief valve and pressure signal capable of use alike on automobiles, busses, and trucks.

A fourth purpose served by my invention is to provide an interchangeable relief valve and pressure signal easily installed, and when necessary, easily repaired, and transferable from one tire to another indefinitely.

To accomplish the aforesaid purposes, I provide a new type of valve mechanism and a new type of power member associated with it, all completely housed in the valve nipple, operated by changes in air pressure in the tire, and adapted to determine automatically the amount of air that can be and should be initally injected into the tire; to relieve the tire of excessive pressure, whatever the cause, in the usual course of operation; to give timely warning of any unusual increase or decrease of pressure in the tire, whatever the cause; and further adapted to be easily installed, and whenever necessary, easily repaired; and especially adapted to be transferable from one tire to another indefinitely, and to be used on automobiles, busses, and trucks alike, whatever the length of the inflation stem may be.

To these and other ends, my invention comprises other improvements and advantages as will be fully described in the accompanying specification, the novel features thereof being set forth in the appended claims.

In the drawings:

Figure 1 is an inflated tube disposed in a vertical plane.

Figure 2 is a vertical section of my invention showing the nipple in the same vertical plane as in Figure 1 attached to an empty tire tube.

Figure 2A, sheet 2, is an enlarged vertical section of a fragment of the nipple of my invention similar to Figure 2.

Figure 3 is a cross section of the neck of the nipple taken on the line 3—3 of Figure 2.

Figure 4 is a cross section of the mechanism of the relief valve taken on the line 4—4 of Figure 2.

Figure 5 is a cross section of the power member taken on the line 5—5 of Figure 2.

Figure 6 is a fragmentary axial section of the mechanism of the relief valve taken at right angles to Figure 2.

Figure 6A sheet 2, is a fragmentary axial section of the relief valve mechanism taken at right angles to Figure 2A, Figure 7 is a lengthwise section of a fragment of the elongated neck of the nipple.

Figure 8, sheet 2, is a cross section of the top of the band 31 taken along the line 8—8 of Figure 2A, sheet 2.

Similar reference numerals in the several figures indicate similar parts.

In illustrating my invention, I have shown in Figure 1 the air chamber only of an inner tube 10 of a pneumatic tire, which when inflated assumes the shape of a circular tube that is also circular in cross section. At any chosen point in the inner circumference of the inner tube 10 there is affixed the nipple of the relief valve divided into two sections 12, 12a shown in detail in Figure 2. The two sections of this member are threaded together at the point indicated by the numeral 11. The lower section penetrates a third of its length into the air chamber and is provided with a circular flange 13 located externally to the wall of the air chamber and adjacent to it, covered by vulcanized rubber, by means of which it is cemented to the radially inner wall of the airchamber of the inner tube, closing completely the hole through which the nipple passed.

A valve is located in the radially inner end of the neck 12b of the nipple 12a adapted to admit air under pressure into the inner tube. It consists of a stem 14 centrally located in the neck of the nipple, a head 15 carried by the stem provided with a rubber pad and normally closed against a removable truncated cone-shaped seat 16 by a compression spring 17. The upper end of the spring engages a nut 18 threaded on to the valve stem which serves to adjust the tension of the spring, and the lower end engages a partition 19 in the neck of the nipple provided with a rectangular slot with a circular center.

A disc 20 provided with multiple slots is interposed between the two sections 12–12a of the nipple. Extending upwards from the valve head 15 is a conical piece 21 removably secured to the stem 14, which being of less diameter than the hole in the valve seat, performs the dual function of securing the rubber pad to the valve head at the same time restricting the opening in the valve seat when the head is but slightly disengaged therefrom.

A rubber cap 22 is stretched over the neck of the valve nipple and is enclosed by retaining closure 23 which engages the threads 24. In line with the valve stem 14, both the rubber cap and the closure are provided with a small alined perforation 25 and in the sides of the closure are round apertures 26. The perforations are for the purpose of permitting small quantities of air to escape at such times when the valve head 15 is but partially disengaged from the valve seat. And the apertures in the closure are for the purpose of permitting large quantities of air to escape when the valve head has been retracted sufficiently to disengage the conical piece 21 completely from the valve seat 16. Such large quantities of air in thus escaping will rupture the cap 22 with a loud report, a warning signal that the air pressure in the tire is dangerously low.

Disposed in the lower section of the nipple 12 is a power member 27 comprising parts adapting it to be actuated by changes in the air pressure in the tire, resulting in the opening and closing of the valve 15—16 in the neck of the nipple 12a. It has two head pieces 28—29 with vertical annular collars 28, 29a, to which is cemented the ends of a short piece of soft rubber tubing 27a. This tubing is compressable lengthwise only, being braced against collapse under air pressure by a compression coil spring 27b interposed between the two headpieces 28, 29.

The headpiece 28 is fasten by a bolt projecting from its center to the disc 20. The headpiece 29 is fasten to a crosspiece between two transmission rods 30, 30a which run upwards through grooves in flanges around the headpiece 28, 29, and slots in the disc 20 to connect at times with the mechanism which operates the valve 15—16.

The operating mechanism consists of a continuous, interchangeable, pliable band 31, reinforced at the top by an inflexible metal bar 31a. The band is trained under a pulley 32, and slidably fastened to the valve stem 14 that projects through a rectangular slot with a circular center in the partition 19 and terminates in a T shaped crossarm that passes through a slot in the top of the band similar to the one in the partition 19, and engages the band head when given a quarter turn.

The metal bar 31a is fastened to the band top by rivets 31b, 31c and serves as a lever with the heads of the rivets serving as fulcrums to pry open the valve 15—16.

The pulley 32 is mounted between two stanchions 33, 33a Figure 6 standing on, and fastened to the disc 20, and extending upwards to close proximity of the end of the valve stem 14, and fastened together at their tops by opposite lateral metal strips 33b, 33c.

The top ends of the transmission rods 30, 30a are bent inwardly to form two catches 30b, 30c which cooperate with three lugs fastened to the outer surface of the band 31 to open and close the valve 15—16 in the neck of the nipple 12a. One of the lugs 34 is triangular in shape with one side longer than the other, and is located at a suitable distance above the normal inactive position of the catch 30c with the short side uppermost; the second lug 35 consists of a short cylindrical rod located at the opposite side of the band on a horizontal line running just above the lug 34; the third lug 36 is located below the lug 35 in contact with the pulley 32. A rectangular band 30d, Figure 4, encompasses the stanchions 33, 33a and is fastened to the catches 30b, 30c serving to steady them.

In order to offset the effect of centrifugal force on the head piece 29 and the operating mechanism of the relief valve, I provide two triangular levers 37, 38 with their short ends of suitable weight which revolve on spindles fastened them to the fulcrums 37a, 38a respectively, the former in front and the latter in back of its fulcrum, which in turn are fastened by a hollow brad 43 which passes through the hole in the middle center of the common base of the fulcrums to the bottom of the nipple 12, so that when the levers are acted upon by centrifugal force, they will push the head piece upwards, thereby offsetting the effect of centrifugal force on it.

My invention is adapted to facilitate the inflation of tires as well as to contribute to their protection, and may be used on automobiles, busses, trucks alike. Where long inflation stems are required on trucks and busses, the neck of the nipple 12a is extended by dividing it into two sections united mediate bushings 39a, 39b by a hollow stem 39 of smaller diameter than the valve nipple neck designated by the numeral 12a-2, Figure 7. The lower section of the neck is curved and joined to the stem 39 permanently, while the upper section designated by the numeral 12a-1 is joined to it by the thread 40. Also the band 31 is correspondingly extended by a piece of pliable wire 41 which connects it to the valve stem 14 mediate a coupling box 42 consisting of a cylinder of sheet metal closed at both ends, the top cover being provided with a rectangular slot similar to the one in the partition 19 in the neck of the nipple 12a, while from the bottom of the box projects a bolt, to which the wire 41 is fastened.

With but slight modifications consisting mainly in the reduction of the length of the hollow stem 39, my invention can be adapted for use on the short angular valve nipple now in general use on automobile tires.

In both the regular nipple and the elongated one, the valve stem 14 may be disconnected from the band 31 by manipulating it, exteriorly first depressing it, and then giving it a quarter turn counter-clockwise. In case of the regular nipple, the band when released from the valve stem will rest on the lateral metal strips 33b, 33c uniting the tops of the stanchions 33, 33a; in the elongated nipple, the coupling box 42 will rest on the end of the hollow stem 39. In either case, the band and the valve stem can be rejoined by reversing the procedure.

The tension of the band 31 may be altered by changing the pulley 32 for one of greater or less diameter as might be required.

The slightly increased initial cost of my invention over the conventional nipple or inflation stem now in use will be more than compensated ultimately because the lower section only of nipple 12 will be fastened permanently to the inner tube, while the entire upper section containing all the operating mechanism except the levers 37, 38 may be transferred from tube to tube indefinitely.

The operation of my invention is as follows:

Beginning with an empty tire, the audible signal is removed from the neck of the nipple 12a and the air pump or tank, as the case may be, is connected to the neck. Air when under pressure will flow through the nipple, passing through the slots in the disc 20 and the hole in the bottom of the nipple into the inner tube.

As air is forced into the inner tube, the increasing pressure will compress the power member; and since the upper head of the power member is fastened to the disc 20, the lower head, when the constant of the spring in the power member has been overcome, will be forced upwards until the catch 30c slides past the lug 34, an act facilitated by the sloping side of the lug, and the inability of the band to move upwards because of the lug 36.

Immediately after the catch 30c has passed the lug 34, the catch 30b will engage the lug 35, and by pushing it upwards cause the band acting by way of the pulley 32 to disengage the valve head 15 from its seat, after which, it will be impossible to inflate the tire further, for if a pump is being used, the air will retrogress from the inner tube with each upward stroke of the pump; or if the tire is being inflated from a tank, any air in excess of the limit predetermined by the power member in cooperation with the band and its accessories will escape from the inner tube upon removal of the nozzle of the air line from the neck of the nipple.

In the same manner excess pressure in the tire caused by frictional heat or atmospheric changes will be released.

After the tire has been inflated to its normal operating pressure and the audible signal restored to its normal position on top of the neck of the nipple, any loss of pressure by leakage will cause the bottom part of the power member to move downwards until the catch 30c engages the short side of the triangular lug 34, and pulls it downward thus causing the band to disengage the valve head 15 from its seat. Whereupon, air will escape from the inner tube through the nipple after the valve has been opened completely in sufficient quantity to rupture the rubber cap with a loud report, signifying that the pressure is dangerously low.

Air will continue to escape through the nipple until the end of the valve stem 14 has been brought in engagement with the tops of the stanchions 33, 33a, when the catch 30c will be forced by the continued downward movement of the band to release its hold on the lug 34, whereupon the spring 17 will regain its normal inactive position and close the valve 15—16, thus preventing the needless loss of air after the warning signal has been sounded.

The power member may be made of several different strengths and is interchangeable, thus permitting the choice of the one best suited to the operating pressure of the tire on which my invention is used.

The lower section of the nipple may be treated as a permanent fixture of the inner tube, and the upper section which is threaded to the lower section may be removed to facilitate the repair or replacement of the operating mechanism, including the valve, and the valve may be removed alone by the exterior manipulation of the valve stem. Moreover, the lower section and all the operating mechanism may be transferred from one tire to another indefinitely. Furthermore, the continuous pliable band being interchangeable, allows the selection of one with the lugs on it best suited to the pressure and capacity of the tire with which it is to be associated.

The rubber cap over the top of the nipple is expendable, and once ruptured, must be replaced.

I claim:

1. In a relief valve and pressure signal for pneumatic tires having a circular air chamber, a vertically disposed nipple located at any chosen point in the circumference of the inner circumferential wall of the air chamber, divided into an upper section and lower section threaded together, the upper section provided with a neck threaded externally to engage internal threads in nozzles of air pumps in general use, the lower section closed at its radially outer end by an integrated bottom having a central hole putting it in communication with the air chamber which it penetrates a third of its length, a circular vulcanized external flange provided on the lower section exterior to the wall of the air chamber, and adjacent to it, cementing the lower section to the wall of the air chamber and closing the hole through which it passed, a circular cup-shaped valve head provided with a rubber pad carried by a valve stem which penetrates the center of the valve head being fastened to it and extending in both directions from it, a conical piece threaded on to the valve stem binding the rubber pad to the valve head and restricting an opening in a truncated cone-shaped valve seat threaded into the top of the neck of the nipple allowing the passage of small quantities of air when the valve head is but slightly disengaged from the valve seat and large quantities when the valve head is completely separated from the valve seat, a compression spring embracing the radially inner end of the valve stem with one end engaging a nut threaded on to the valve stem by which the tension of the spring is regulated, and the other end of the spring engaging a partition in the neck of the nipple provided with a rectangular slot, through which the radially outer end of the valve stem projects, an inverted T shaped crossarm provided on the end of the valve stem passable through the slot in the partition in the neck of the nipple, also passable through a similar slot in the top part of a continuous pliable band, to which the valve stem may be locked by turning it clockwise, an interchangeable power member actuated by changes in the air pressure in the inner tube disposed in the lower section of the nipple comprising two headpieces with annular collars connected by a soft rubber tube, a compression spring disposed in the rubber tube bracing it against collapse under air pressure and spacing the two head pieces, the radially inner headpiece being fastened immovably to a disc between the two sections of the valve nipple and the other headpiece being free to move upwardly and downwardly in response to changes in the air pressure in the inner tube, two transmission rods joined at their radially outer ends by a crossbar running through diametrically opposite grooves in flanges around the outer ends of the two headpieces and slots in the disc held between the two sections of the valve nipple fastened by means of the crossbar to a downward pointed projection from the radially outer headpiece, the upper free ends of the transmission rods being bent inwardly to form catches which at times engage lugs fastened to the outer surface of the pliable band, two stanchions standing on and fastened to the disc held between the two sections of the valve nipple midway between the two slots through which the transmission rods pass and extending to the proximity of the end of the valve stem with their tops joined by two opposite lateral crosspieces, beneath the top of the continuous band, an interchangeable pulley mounted between the bottom part of the two stanchions, under which the pliable band runs upwards to be connected to the end of the valve stem, the shape, position, and functions of the slot in the partition in the neck of the nipple, the slot in the top of the pliable band, the lateral crosspieces at the top of the stanchions, and the terminus of the valve stem being such that the band and the valve stem may be connected or disconnected by exterior manipulation of the valve stem, and the composite valve removed or replaced, multiple lugs suitably shaped and placed fastened to the outer surface of the band cooperating at times with the catches at the top of the transmission rods to open and close the valve in the neck of the nipple, and an audible signal threaded on the neck of the valve nipple actuated by air escaping from the inner tube at times when the valve has been opened through the valve nipple.

2. In a relief valve and pressure signal for pneumatic tires having an inner tube forming a circular air chamber when inflated, a vertically disposed nipple located at any chosen point in the circumference of the inner circumferential wall of the air chamber, divided into an upper section and a lower section united by threads, the upper section provided with a neck threaded externally to engage similar threads in nozzles of air pumps in general use, the lower section closed at the radially outer end by an integrated bottom with a central hole putting the said lower section in communication with the air chamber which it penetrates a third of its length, a circular vulcanized flange provided on the lower section exterior to the wall of the air chamber and adjacent to it, by means of which the lower section of the nipple is cemented to the wall of the air chamber closing the hole through which it passes, a circular valve head provided with a rubber pad carried by a valve stem which penetrates the center of the valve head, being fastened to it and extending in both directions from it, a conical piece threaded on to the valve stem binding the rubber pad to the top of the valve head and restricting an opening in a valve seat threaded into the neck of the valve nipple, allowing the passage of small quantities of air when the valve head is but slightly disengaged from the valve seat and larger quantities when the valve head is further separated from the valve seat, a compression spring embracing the radially inner end of the valve stem with one end engaging a nut threaded on to the valve stem, by which the tension of the spring is regulated and the other end of the spring engaging a partition in the neck of the nipple provided with a rectangular slot with a circular center, through which the radially outer end of the valve stem projects, an inverted T shaped crossarm provided on the end of the valve stem passable through the slot in the partition in the neck of the nipple, also passable through a similar slot in the top part of a continuous pliable band to which the valve stem may be locked by giving it a quarter turn clockwise, an interchangeable power member actuated by changes in the air pressure in the inner tube disposed in the lower section of the valve nipple comprising two headpieces with annular collars connected by a soft rubber tube, a compression spring disposed in the rubber tube bracing it against collapse under air pressure and spacing the two headpieces, the radially inner headpiece being fastened immovably to a disc held between the two sections of the valve nipple and the other headpiece being free to move upwardly and downwardly in response to changes in the air pressure in the inner tube, two transmission rods joined at their radially outer ends by a crossbar running upwardly through diametrically opposite grooves in flanges around the outer ends of the two headpieces and slots in the disc held between the two sections of the valve nipple fastened by means of the crossbar to the radially outer headpiece, the upper free ends of the transmission rods being bent inwardly to form catches which at times engage lugs fastened to the outer surface of the pliable band, two stanchions standing on and fastened to the disc held between the two sections of the valve nipple and extending to the proximity of the end of the valve stem with their tops joined by two opposite lateral crosspieces, beneath the top of the continuous band, interchangeable pulley mounted between the bottom part of the two stanchions, under which the continuous pliable band runs upwards to be locked to the end of the valve stem, the shape, position, and functions of the slot in the partition in the neck of the valve nipple, the similar slot in the top of the pliable band, the lateral crosspieces at the top of the stanchions and the terminus of the valve stem being such that the band and the valve stem may be connected and disconnected by exterior manipulation of the valve stem and the composite valve may be removed, repaired or replaced, multiple lugs suitably shaped and placed fastened to the outer surfaces of the continuous pliable band cooperating at times with the catches at the top of the transmission rods to open and close the valve in the neck of the valve nipple, two triangular levers revolving on spindles in fulcrums fastened to the bottom of the valve nipple adapted to exert an upward pressure on the bottom head piece of the power member when acted on by centrifugal force created by the rotation of the tire with which the relief valve may be associated to offset the effect of the same force on the said head of the power member, an audible signal comprising a rubber cap covering the neck of the valve nipple capable of rupture by air under pressure escaping from the inner tube through the valve nipple when the valve in the neck thereof is open provided with an air vent to prevent it from being ruptured by a small quantity of air, a retaining closure having an air vent in alinement with the one in the rubber cap to allow small quantities of air to escape through it when the air valve is but partially opened and apertures in its sides to allow the rupture of the cap by large quantities of air escaping in excess of the capacity of the air vent to discharge it when the air valve is more fully opened, the air continuing to escape until the end of the valve stem has been drawn down in opposition to the valve spring to engage the top of the stanchions, when the catch and the lug with which it cooperated to open the valve will be forcibly separated by the continuing downward movement of the transmission rods, allowing the valve spring to regain its normal inactive position to close the valve to prevent needless loss of air through the valve nipple after the warning signal has been given by the rupture of the rubber cap.

3. In a relief valve and pressure signal for pneumatic tires having an inner tube forming a circular air chamber when inflated, a vertically disposed nipple located at any chosen point in the circumference of the inner circumferential wall of the air chamber, divided into an upper section and a lower section united by threads, the lower section closed at its radially outer end by an integrated bottom with a central hole putting the said lower section in communication with the air chamber which it penetrates a third of its length, a circular vulcanized flange provided on the lower section exterior to the wall of the air chamber and adjacent to it, by means of which the lower section of the nipple is cemented to the wall of the air chamber closing the hole through which it passed, the upper section of the nipple being provided with a neck divided into two sections, a neck provided for the upper section of the nipple itself divided into two parts connected by a hollow stem of a smaller diameter, the union between the hollow stem and the lower section of the neck made permanent and the union with the upper section as well as the top of the neck threaded, a valve head engaging a valve seat having the shape of a truncated hollow cone closing the radially inner end of the neck, a stem projecting both radially inwardly and outwardly from the center of the valve head, a conical piece threaded on to the valve stem binding a rubber pad to the inner surface of the valve head and restricting the opening in the valve seat allowing the passage of air when the valve head is but slightly withdrawn in small quantities, and in larger quantities when the valve head is farther withdrawn, a compression spring embracing the radially inner end of the valve stem with one end engaging a nut threaded on to the valve stem, by which the tension of the spring is regulated, and the other end of the spring engaging a partition in the neck of the nipple provided with a rectangular slot with a circular center, through which the radially outer end of the stem projects, an inverted T shaped crossarm provided on the end of the valve stem passable through the slot in the neck of the nipple, also passable through a similar slot in a coupling box, to which the valve stem may be locked, the coupling box consisting of a cylinder closed at both ends, with the slot in the top and a bolt projecting downwardly from the bottom cover, being locked to the end of the valve stem by giving it a quarter turn clockwise, a pliable wire fastened to the bolt projecting from the bottom of the coupling box running through both sections of the neck of the valve nipple and the hollow stem connecting them, to the top of a continuous pliable band, thereby connecting the band to the end of the valve stem, and interchangeable power member actuated by changes in the air pressure in the inner tube disposed in the lower section of the valve nipple comprising two headpieces with annular collars connected by a soft rubber tube, a compression spring disposed in the rubber bracing it against collapse under air pressure and spacing the two headpieces, the radially inner headpiece being fastened immovably to the disc held between the two sections of the valve nipple and the other headpiece being free to move upwardly and downwardly in unison with changes in the air pressure in the inner tube, two transmission rods joined at their radially outer ends by a crossbar running upwardly through diametrically opposite grooves in flanges around the outer ends of the two headpieces and slots in the disc held between the two sections of the valve nipple fastened by means of the crossbar to the radially outer headpiece, the upper free ends of the transmission rods being bent inwardly to form catches, two stanchions standing on and fastened to the disc held between the two sections of the valve nipple midway between the slots through which the transmission rods pass with their tops united by two opposite lateral crosspieces in proximity to the base of the neck of the valve nipple, beneath the top of the continuous band, a vertically adjustable pulley mounted between the bottom ends of the two stanchions, under which the continuous pliable band runs, lugs suitably shaped and placed fastened to the outer surface of the continuous band at times engaged by the catches formed by the inwardly turned ends of transmission rods and cooperating with them to open and close the valve in the neck of the valve nipple, an audible signal threaded on to the neck of the valve nipple actuated at times by air escaping from the inner tube through the valve nipple when the valve in the neck thereof has been opened.

References Cited in the file of this patent
UNITED STATES PATENTS
1,878,411    Lambert _____ Sept. 20, 1932